United States Patent
Asahina et al.

(10) Patent No.: US 7,785,377 B2
(45) Date of Patent: Aug. 31, 2010

(54) SEALED BATTERY AND METHOD FOR MANUFACTURING THE SAME

(75) Inventors: Takashi Asahina, Aichi (JP); Shinji Hamada, Aichi (JP); Toyohiko Eto, Aichi (JP); Shinichi Yuasa, Kyoto (JP)

(73) Assignees: Toyota Jidosha Kabushiki Kaisha, Aichi (JP); Panasonic Corporation, Osaka (JP)

( * ) Notice: Subject to any disclaimer, the term of this patent is extended or adjusted under 35 U.S.C. 154(b) by 33 days.

(21) Appl. No.: 12/239,329

(22) Filed: Sep. 26, 2008

(65) Prior Publication Data
US 2009/0023063 A1    Jan. 22, 2009

Related U.S. Application Data
(63) Continuation of application No. 10/862,378, filed on Jun. 8, 2004, now abandoned.

(30) Foreign Application Priority Data
Jun. 9, 2003    (JP)    .............................. 2003-163749

(51) Int. Cl.
*H01M 4/82* (2006.01)
*H01M 2/26* (2006.01)
*H01M 2/02* (2006.01)
*H01M 2/08* (2006.01)
(52) U.S. Cl. .................. 29/623.2; 429/161; 429/181; 429/185
(58) Field of Classification Search .............. 429/185, 429/181, 161, 178, 179, 175; 29/623.2
See application file for complete search history.

(56) References Cited

FOREIGN PATENT DOCUMENTS

| JP | 8-77999 | 3/1996 |
|---|---|---|
| JP | 2000-48803 | 2/2000 |
| JP | 2000-200597 | 7/2000 |
| JP | 2000-331656 | 11/2000 |
| JP | 2003-123730 | 4/2003 |

OTHER PUBLICATIONS

English language Abstract of JP 8-77999, Kojima et al., Mar. 1996.
English language Abstract of JP 2000-48803, Fukunaga, Takao, Feb. 2000.
English language Abstract and partial translation of JP 2000-331656, Ono, Takuji Nov. 2000.
English language Abstract of JP 2000-200597, Fukunaga et al., Jul. 2000.
English language Abstract of JP 2003-123730, Asahina et al., Apr. 2003.

*Primary Examiner*—Patrick Ryan
*Assistant Examiner*—Thomas H. Parsons
(74) *Attorney, Agent, or Firm*—Greenblum & Bernstein P.L.C.

(57) ABSTRACT

A sealed battery includes a metal case which functions as a connection terminal of one polarity and an electrode post which is mounted to the case in an insulated manner and functions as a connection terminal of the other polarity. A sealing section with electrical insulation properties is disposed between the electrode post formed from a hollow cylinder with one closed end and an electrode post through-hole provided in the case. A compression deformation section is produced by deforming the closed end of the electrode post radially outward, for compressing and sealing the sealing section, and for securing the electrode post to the case.

14 Claims, 5 Drawing Sheets

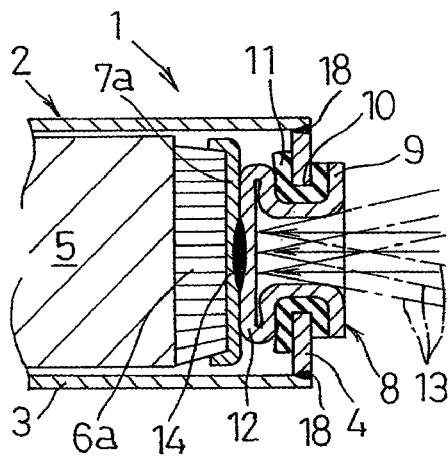
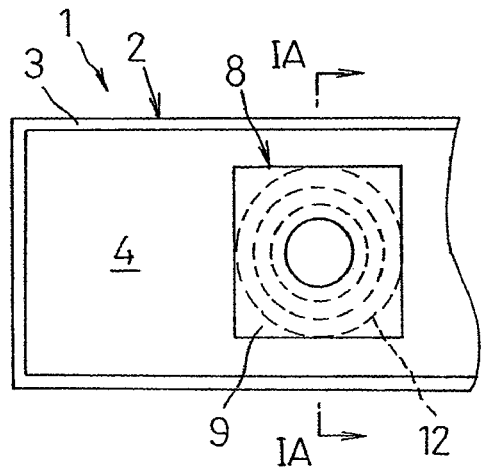
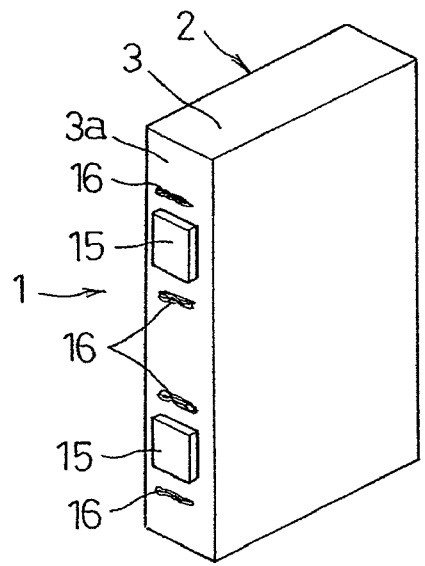
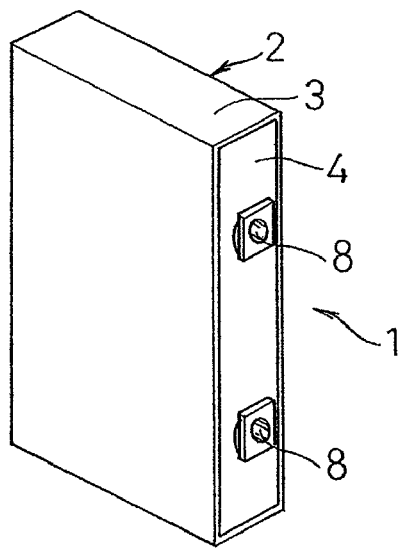

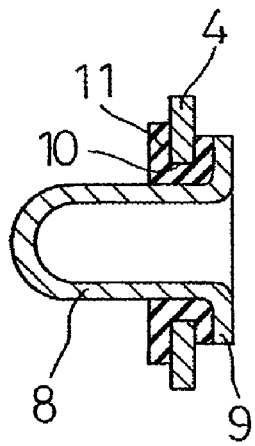 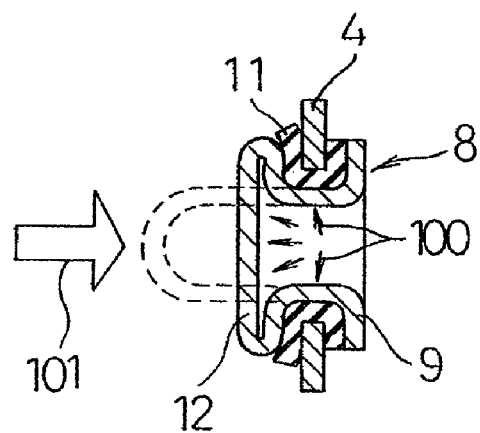
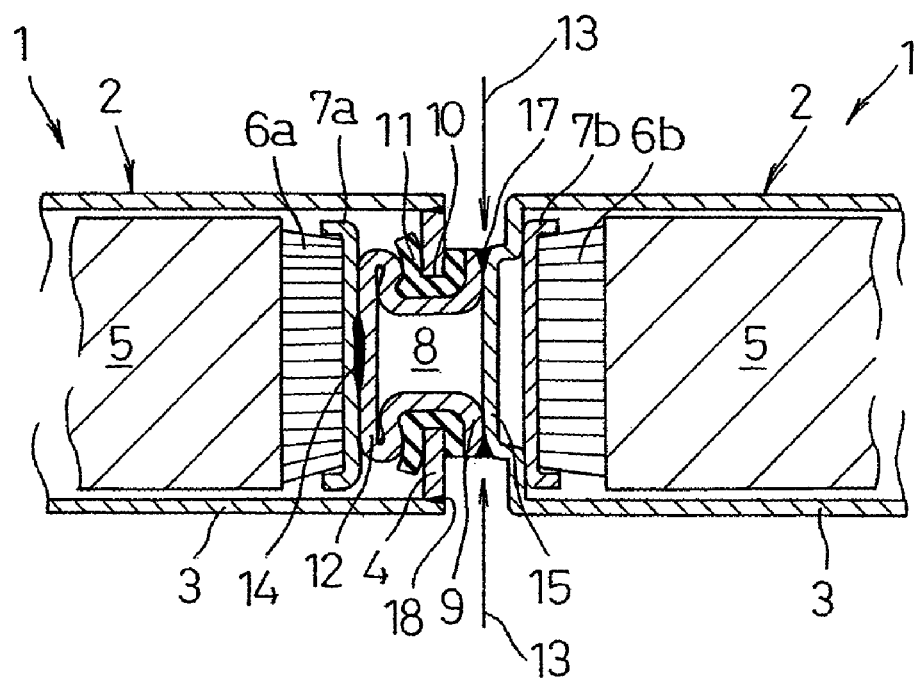

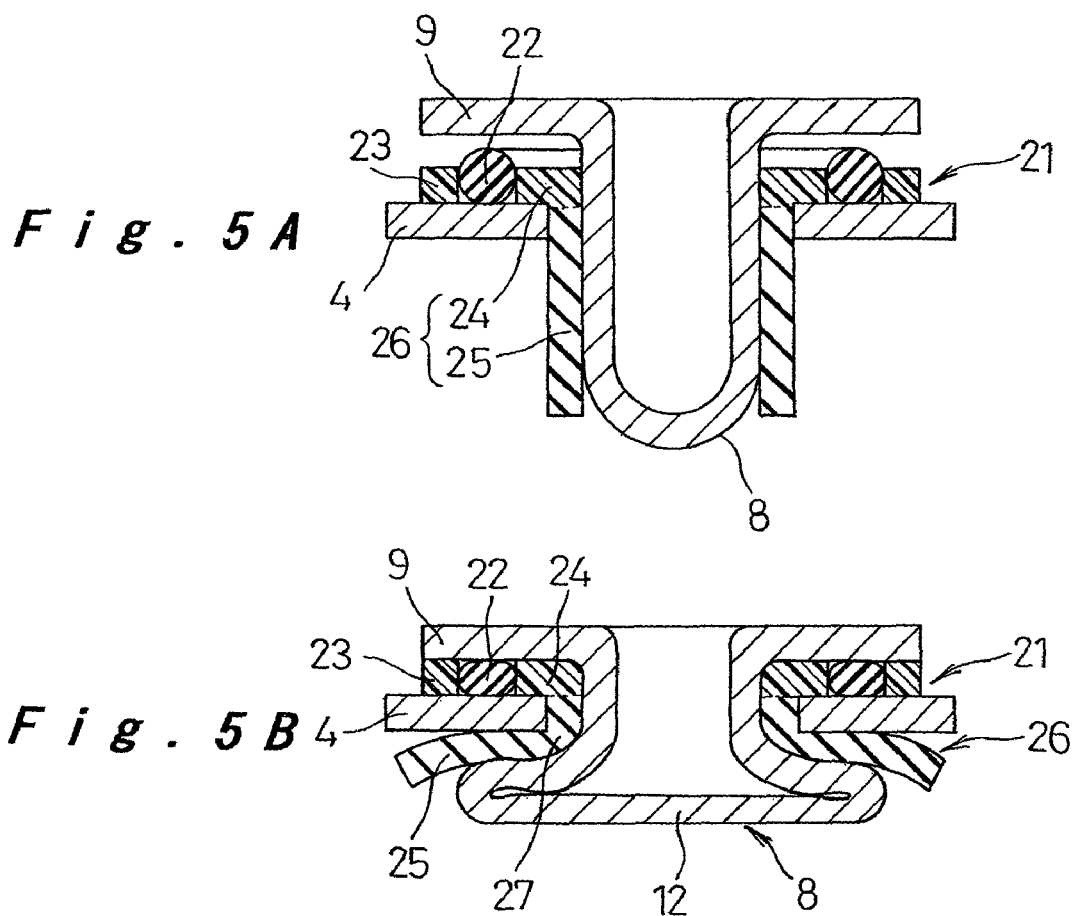

SEALED BATTERY AND METHOD FOR MANUFACTURING THE SAME

The present application is a continuation application of U.S. application Ser. No. 10/862,378 filed Jun. 8, 2004, which relates to subject matter contained in priority Japanese Patent Application No. 2003-163749, filed on Jun. 9, 2003, the contents of which is herein expressly incorporated by reference in its entirety.

BACKGROUND OF THE INVENTION

1. Field of the Invention

The present invention relates to a sealed battery and a method for manufacturing the same, and more particularly to an electrode post structure which enables reductions to be achieved in the weight of the battery, the number of components, and the battery cost, while retaining highly reliable sealing of the electrolyte.

2. Description of the Related Art

In recent years, environmental concerns have prompted considerable interest in electric vehicles and hybrid vehicles that use fuel cells or rechargeable batteries as a power source, and the rechargeable battery that functions as the power source or auxiliary power source for these vehicles should ideally be as small and as light as possible, while providing maximum capacity and output. Examples of sealed rechargeable batteries that satisfy these requirements include lithium ion rechargeable batteries and nickel-metal hydride batteries.

In these types of sealed batteries, if a metal case is used to reduce gas permeation and improve the cooling properties of the battery, then the electrode post that functions as the external connection terminal must be insulated with respect to the case and sealed with respect to the electrolyte in the region where the post passes through the case.

One example of a conventional electrode post construction is shown in FIG. 8 (see Japanese Patent Laid-Open Publication No. Hei 8-77999). This electrode post 41 is equipped with column sections 43, 44 at the top and bottom of a main body 42, and the lower column section 44 is inserted into an electrode post through-hole 46 formed in the case 45, with insulating packing 47 provided between the lower column section 44 and the case 45. A current collecting washer 49 that is connected to one end of an electrode plate assembly is provided on the inside surface of the case 45 with packing 48 disposed therebetween, and a crimped section 50 formed on the bottom end of the lower column section 44 connects the electrode post 41 to the current collecting washer 49 and secures the electrode post 41 to the case 45.

Another conventional electrode post construction is shown in FIG. 9 (see Japanese Patent Laid-Open Publication No. 2000-48803). This electrode post 51 is inserted into an electrode post through-hole 56 formed in the case 55, with insulating packing 52 provided between the electrode post 51 and the case 55. Additional packing 54 is provided between the inside surface of the case 55 and a packing support collar 53, which protrudes outward from the outer periphery near the bottom of the electrode post 51, and a nut 57 that is screwed onto the externally protruding section of the electrode post 51 is used to secure the electrode post 51 to the case 55.

However, in a battery pack used as the power source for a vehicle, even a reduction in weight of several hundred grams is important. Moreover, a battery pack comprises a plurality of cells connected in series to achieve the prescribed output voltage, and because the electrode posts are comparatively heavy, the weight of the electrode posts has a significant effect on the overall weight of the battery pack. Furthermore, because leakage of the electrolyte can result in short circuiting caused by corrosion, the sealing of the electrolyte must be maintained with a high level of reliability over extended periods, even under severe operating conditions.

However, in the electrode post construction shown in FIG. 8, because only the bottom end of the electrode post 41 is hollow, the weight of the electrode post is considerable. Furthermore, because the gap between the main body 42 and the crimped section 50 is sealed with respect to the electrolyte simply by compressing the insulating packing 47 between the lower column section 44 and the through-hole 46, the sealing performance varies considerably, and achieving reliable electrolyte leakage prevention over an extended period is difficult.

Furthermore in the electrode post construction shown in FIG. 9, tightening the nut 57 seals the structure by causing a compression of both the insulating packing 52 between the electrode post 51 and the through-hole 56, and the packing 54 between the packing support collar 53 and the inside surface of the case 55, and thus provides a superior seal to the construction shown in FIG. 8. However, the sealing pressure generated within the insulating packing 52 is not particularly high, meaning the sealing performance cannot be increased significantly, and the increase in the number of components causes increases in both the weight and the cost of the structure.

SUMMARY OF THE INVENTION

The present invention takes the above problems associated with the conventional technology into consideration, with an object of providing a sealed battery which achieves reductions in the weight of the battery, the number of components, and the battery cost, while retaining highly reliable sealing of the electrolyte, as well as a method for manufacturing such a sealed battery.

A sealed battery of the present invention includes a metal case which functions as a connection terminal of one polarity, and an electrode post which is mounted to the case in an insulated manner and functions as a connection terminal of the other polarity, wherein a sealing section with electrical insulation properties is disposed between the electrode post, which is formed from a hollow cylinder with one closed end, and an electrode post through-hole provided in the case, and a compression deformation section produced by deforming the closed end of the electrode post radially outward is used for compressing and sealing the sealing section, and for securing the electrode post.

According to such a construction, a hollow cylinder with one closed end is used for the electrode post, and a compression deformation section produced by deforming the closed end of the electrode post is used for compressing and sealing the sealing section, and for securing the electrode post. Consequently, both the weight and the cost of the structure are reduced, and highly reliable sealing is ensured.

The compression deformation section of the electrode post can be formed by applying pressure in an axial direction to the closed end of the electrode post, while the hollow interior of the electrode post is subjected to fluid pressure.

Furthermore, by bringing the electrode post into contact with a collector that is joined to the end face of one polarity of an electrode plate assembly housed in the case, and then welding the end wall of the electrode post to the collector from a position outside the case through the hollow interior of the electrode post, a direct connection between the electrode post and the electrode plate assembly is achieved, thereby enabling a reduction in the connection resistance, as well as reductions in the weight and cost of the structure.

The end wall of the electrode post and the collector may be joined by laser beam welding or electron beam welding.

Furthermore, the sealing section preferably includes an O-ring which is sandwiched in a compressed state between the outside surface of the case and the electrode post, a backup section that regulates the position of the inner and outer peripheries of the O-ring, and an insulating spacer which is disposed between the through-hole and the electrode post, and between the compression deformation section at one end of the electrode post and the inside surface of the case. By compressing the insulating spacer strongly between the corner of the through-hole and the corner of the deformation section at one end of the electrode post, and also compressing the O-ring within the backup section, a double seal is achieved that provides an even more reliable electrolyte seal.

Furthermore, a collar that extends radially outwards is provided at the opposite end of the electrode post from the deformation section, and at least one side edge of this collar preferably runs parallel to the edge of the prismatic case. In those cases where this electrode post is then connected to the connection terminal of another sealed battery by electron beam welding or laser beam welding, the connection is achieved by welding this side edge of the collar, and because the welding is completed by simply moving the welding point in a straight line, a high quality weld is formed with good efficiency.

Furthermore, if both side edges of the collar run parallel to the long side surface of the case, then both side edges of the collar can be welded in the same manner, thereby increasing the surface area of the weld joint, as well as decreasing the connection resistance between the sealed batteries.

Furthermore, if a protrusion that corresponds with the electrode post is formed on the opposite side surface from the side surface of the case of another sealed battery, on which the electrode post is disposed, and at least one side edge of the protrusion and one side edge of the collar are aligned in terms of their relative positions on the protrusion side surface and the electrode post side surface respectively, then when a plurality of sealed batteries are connected in series to form a battery module, the side edges of the aligned electrode posts and protrusions are joined by electron beam welding or laser beam welding with good levels of productivity.

In addition, if a connection plate section that can be elastically displaced in the electrode post axial direction is provided on the collar, then when the electrode posts and protrusions of a plurality of sealed batteries are joined together and connected in series to form a battery module, by joining the side edges of the connection plate sections and the protrusions, any variations in the dimensions of each sealed battery can be absorbed by the elastic displacement of the connection plate section. This means that each sealed battery occupies the same space, and so when a plurality of battery modules are arranged in parallel with insulating sheets disposed therebetween to form a battery pack, the ease of installation of these insulating sheets is improved.

A method for manufacturing a sealed battery according to the present invention includes: inserting a hollow cylindrical electrode post with one closed end into an electrode post through-hole provided in a lid of a case, with the closed end inserted first and with a sealing section that displays electrical insulation properties and sealing properties disposed between the lid and the electrode post; activating the sealing properties of the sealing section and securing the electrode post to the lid by subjecting the closed end of the electrode post to an outward expansion in the radial direction and a compression deformation in the axial direction; housing an electrode plate assembly inside the case; joining the lid to the case; joining one end wall of the electrode post to the end face of one polarity of the electrode plate assembly from a position inside the hollow interior of the electrode post; and joining the end face of the other polarity of the electrode plate assembly to the bottom wall of the case.

The compression deformation of the electrode post can be conducted by applying pressure in the axial direction to the closed end of the electrode post, while the hollow interior is subjected to fluid pressure.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIGS. 1A and 1B show the essential structural elements of a sealed battery according to a first embodiment of the present invention, wherein FIG. 1B is a front view, and FIG. 1A is a cross-sectional view taken along the line IA-IA shown in FIG. 1B;

FIGS. 2A and 2B show the external appearance of the sealed battery of the embodiment, wherein FIG. 2A is a perspective view from the bottom of the case main body, and FIG. 2B is a perspective view from the lid;

FIGS. 3A and 3B show an electrode post mounting step according to the embodiment, wherein FIG. 3A is a cross-sectional view showing the electrode post inserted through the lid, and FIG. 3B shows a cross-sectional view following formation of a compression deformation section;

FIG. 4 is a cross-sectional view showing a connection between two sealed batteries of the embodiment;

FIGS. 5A and 5B show an electrode post mounting step for a sealed battery according to a second embodiment of the invention, wherein FIG. 5A is a cross-sectional view showing the electrode post inserted through the lid, and FIG. 5B shows a cross-sectional view following formation of a compression deformation section;

FIGS. 6A, 6B, and 6C show the essential structural elements of a sealed battery according to a third embodiment of the invention, wherein FIG. 6A is a front view, FIG. 6B is a cross-sectional view taken along the line VIB-VIB shown in FIG. 6A, and FIG. 6C is a cross-sectional view taken along the line VIC-VIC shown in FIG. 6A;

DETAILED DESCRIPTION OF THE PREFERRED EMBODIMENTS

First Embodiment

Figure 6A:
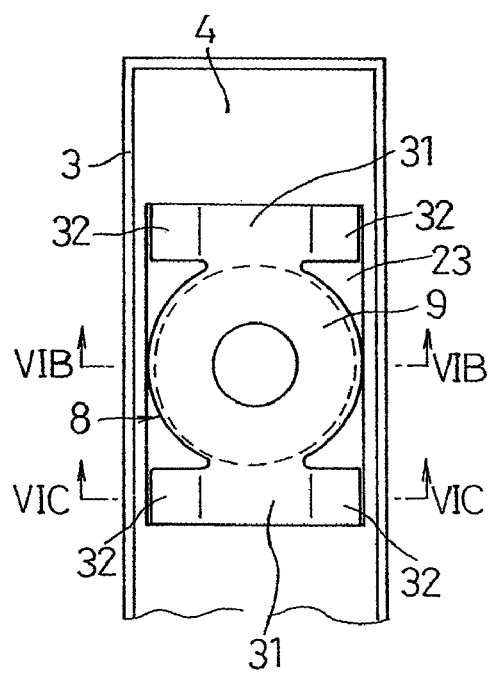

A first embodiment of a sealed battery of the present invention will be described in detail with reference to FIG. 1A through FIG. 4.

In FIG. 1A through FIG. 2B, the reference numeral 1 represents a prismatic sealed battery, which includes an electrode plate assembly 5 and an electrolyte as the power generation elements housed inside a case 2 formed by welding a metal lid 4 to the opening at one end of a metal box-shaped case main body 3. In the case of a nickel-metal hydride rechargeable battery, the case main body 3 and the lid 4 are formed from nickel-plated steel plate in order to ensure the required electrolyte resistance, whereas in the case of a lithium ion rechargeable battery, they are formed from an aluminum alloy.

The electrode plate assembly 5 is formed from a plurality of layered positive and negative electrode plates with separators disposed therebetween, and the core materials of the positive electrode plates and the negative electrode plates respectively protrude from opposite ends of the electrode plate assembly 5, forming leads 6a, 6b (see FIG. 4) for the positive electrode and the negative electrode respectively. Collector plates 7a, 7b (see FIG. 4) for the positive electrode and the negative electrode respectively are joined to the end faces of the leads 6a, 6b.

As shown in FIG. 1A and FIG. 2B, a pair of electrode posts 8, which function as the external connection terminals for the positive electrode for example, are mounted to the lid 4 with an interval therebetween. Each electrode post 8 is formed from a hollow cylinder with one closed end, and with a collar 9 that extends radially outward provided at the other end. Through-holes 10 into which the electrode posts 8 are inserted are formed in the lid 4, and an annular sealing member 11 with an approximately U-shaped cross-section is provided at each through-hole 10. The sealing member 11 contacts both sides of the lid 4 around the periphery of the through-hole 10, and also engages with the outer peripheral surface of the electrode post 8 and the inner peripheral surface of the through-hole 10.

As shown in FIG. 3A, the sealing member 11 is installed in the through-hole 10 of the lid 4, and the closed end of the electrode post 8 is then inserted through the through-hole 10. Then, as shown in FIG. 3B, the hollow interior of the electrode post 8 is subjected to fluid pressure as shown by the arrows 100, while compression is applied from the closed end in the axial direction shown by the arrow 101, thereby forming a compression deformation section 12 that extends radially outward at the closed end of the electrode post 8, as shown in FIG. 3B and FIG. 1A. This compression deformation section 12 compresses the sealing member 11 causing sealing, and also secures the electrode post 8 to the lid 4 by sandwiching the sealing member 11 and the lid 4 between the compression deformation section 12 and the collar 9.

When the lid 4 is then joined to the case main body 3 to form the case 2, the end wall of the compression deformation section 12 of the electrode post 8 contacts the collector plate 7a, and as shown in FIG. 1A, with the structure maintained in this state, a laser beam 13 or an electron beam is irradiated from outside the case 2, through the hollow interior of the electrode post 8 and onto the end wall of the compression deformation section 12, thus welding this end wall to the collector plate 7a, and joining the collector plate 7a and the electrode post 8 together via a weld section 14. During this process, because the hollow interior of the electrode post 8 has a comparatively large cross-sectional area, a laser beam 13 with a convergence angle of 26 to 30° such as that shown in FIG. 1A can be employed, enabling a reduction in production costs.

In addition, as shown in FIG. 2A, a pair of rectangular protrusions 15 are formed in the bottom wall 3a of the case main body 3 in positions corresponding with the electrode posts 8, and the collector plates 7b for the negative electrode contact the inside surface of the bottom wall 3a of the case main body 3 (see FIG. 4), and are joined to the bottom wall 3a by a laser beam weld 16 or an electron beam weld on both sides of the corresponding protrusion 15.

Furthermore, both side edges of each protrusion 15 are parallel with the long side surface of the case main body 3, and as shown in FIG. 1B, the collar 9 of each electrode post 8 is also formed in a rectangular shape in which both side edges are parallel to the edges of the long side of the lid 4. Moreover, the side edges of each protrusion 15 and the side edges of the collar 9 of the corresponding electrode post 8 are aligned in terms of their relative positions on the bottom wall 3a and the lid 4 respectively.

If a plurality of sealed batteries 1 are connected in series to form a battery module, by joining the electrode posts 8 of one sealed battery 1 to the protrusions 15 of another sealed battery 1, then as shown in FIG. 4, the two batteries are joined together with good productivity by joining the side edges of the collar 9 of each electrode post 8 to the side edges of the corresponding protrusion 15, by irradiating a laser beam 13 or an electron beam through the gap between the two battery cases 2 to form a laser beam weld 17 or an electron beam weld. Because the weld is formed by simply moving the welding point in a straight line, a high quality weld is formed with good efficiency, and by welding both side edges of each collar 9 and protrusion 15, the surface area of the weld joint is increased, and the connection resistance between the sealed batteries is reduced.

Next is a description of the steps required for manufacturing the sealed battery 1 described above. First, as shown in FIG. 3A, the sealing member 11 is mounted in the electrode post through-hole 10 provided in the lid 4, and the hollow cylindrical electrode post 8 with one closed end is inserted into the through-hole 10, with the closed end inserted first. Subsequently, as shown in FIG. 3B, the hollow interior of the electrode post 8 is subjected to fluid pressure, while compression is applied in an axial direction from the closed end of the electrode post 8, thus subjecting the closed end to an outward expansion in the radial direction and a compression in the axial direction, thereby forming the compression deformation section 12, compressing and sealing the sealing member 11, and securing the electrode post 8 to the lid 4.

Next, the electrode plate assembly 5 is housed inside the case main body 3, and the collector plate 7b and the bottom surface of the case main body 3 are joined together by either a laser beam weld 16 or an electron beam weld. Subsequently, the lid 4 is engaged in the opening of the case main body 3, and the joint section is sealed by either a laser beam weld 18 or an electron beam weld, thus sealing the case 2. At this point, the closed end wall of the electrode post 8 is in contact with the collector plate 7a, and by irradiating a laser beam 13 from outside the case 2, through the hollow interior of the electrode post 8 and onto this end wall of the electrode post 8, the electrode post 8 and the collector plate 7a are connected together via the weld section 14.

Subsequently, electrolyte is injected into the case 2 through an injection port (not shown in the drawings) formed in either the bottom wall of the case main body 3 or the lid 4, and a safety vent (not shown in the drawings) is then installed to close the injection port and complete the production of the sealed battery 1.

According to the embodiment described above, the hollow cylindrical electrode post 8 with one closed end is used, and the compression deformation section 12 formed by deforming that closed end is used to activate the sealing properties of the sealing member 11 and secure the electrode post 8 to the lid, and consequently not only are the weight and the cost of the electrode post reduced, but a highly reliable seal is also achieved. Furthermore, the compression deformation section 12 is formed in a single step by subjecting the closed end of the electrode post to compression in the axial direction, while applying fluid pressure to the hollow interior of the electrode post 8.

Furthermore, because one of the collector plates 7a of the electrode plate assembly 5 housed inside the case 2 contacts the electrode post 8, and the end wall of the electrode post 8 and the collector plate 7a are then joined together by either laser beam welding or electron beam welding conducted by irradiating the beam from outside the case 2 and through the hollow interior of the electrode post 8, the electrode post 8 and the electrode plate assembly 5 are connected directly together with good productivity. This process also enables a reduction in the number of components, and reductions in both the connection resistance and the weight of the structure.

In addition, because both side edges of the collar 9, which is provided at the opposite end of the electrode post 8 from the closed end, run parallel to the long side surface of the case 2, when the electrode post 8 is connected by laser beam welding or electron beam welding to a connection terminal such as the protrusion 15 of another sealed battery 1, the welds are generated by simply moving the welding point in a straight line along the side edges of the collar 9, meaning a high quality weld is formed with good efficiency. Furthermore, by welding both side edges of the collar 9, the surface area of the weld joint is increased, and the connection resistance between the sealed batteries is reduced.

In particular, because the protrusion 15 that functions as a connection terminal is formed on the bottom wall 3a of the case main body 3 in a position corresponding with the electrode post 8, and the side edges of the protrusion 15 and the side edges of the collar 9 are aligned in terms of their relative positions, when a plurality of sealed batteries 1 are connected in series to form a battery module, the aligned side edges of the electrode post 8 and the protrusion 15 are joined by either electron beam welding or laser beam welding with good levels of productivity.

Second Embodiment

A second embodiment of a sealed battery of the present invention will be described in detail with reference to FIG. 5A and FIG. 5B. In the following description of this second embodiment, those structural features which are the same as the first embodiment are ignored, with the description focusing on only those features that are different.

In the first embodiment, the sealing member 11 with an approximately U-shaped cross-section is used as the seal for the electrode post through-hole, but as shown in FIG. 5A and FIG. 5B, the sealing section 21 in this second embodiment includes an O-ring 22 which is sandwiched in a compressed state between the outside surface of the lid 4 and the collar 9 of the electrode post 8, a backup member 23 that regulates the position of the outer periphery of the O-ring 22, and an insulating spacer 26 made up of a backup collar 24 that regulates the position of the inner periphery of the O-ring 22 and a cylindrical spacer 25 that extends in an integrated manner from the inner periphery of the backup collar 24. The outer periphery of this cylindrical spacer 25 engages with the inner periphery of the through-hole 10, whereas the inner periphery of the spacer 25 engages with the outer periphery of the pre-deformation electrode post 8, prior to the formation of the compression deformation section 12, as shown in FIG. 5A. Suitable materials for these sealing members include polypropylene for the backup member 23, nylon 66 for the insulating spacer 26, and a high hardness material for the backup collar 24. The backup collar 24 may also be formed as a separate component from the cylindrical spacer 25.

Once the electrode post 8 has been inserted, compression is applied from the closed end while a fluid pressure load is applied to the hollow interior of the electrode post 8, in a similar manner to the first embodiment, thus forming the compression deformation section 12 at the closed end of the electrode post 8 as shown in FIG. 5B, as well as compressing the O-ring 22 between the backup member 23 and the backup collar 24, thus generating a pressure seal. At the same time, the radial outward expansion of the compression deformation section 12 forces the cylindrical spacer 25 radially outward, compressing the cylindrical spacer 25 between the inside surface of the lid 4 and the compression deformation section 12, and a particularly strongly compressed section 27 is generated between the corner of the through-hole 10 and the corner of the compression deformation section 12.

According to the sealing section 21 of this embodiment, the electrode post through-hole has a double seal provided by the compressed O-ring 22 and the strongly compressed section 27, and consequently a highly reliable electrolyte seal is achieved.

Third Embodiment

Figure 6B:
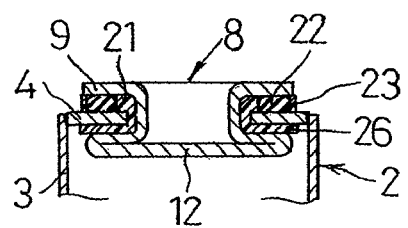

A third embodiment of a sealed battery of the present invention will be described in detail with reference to FIG. 6A through FIG. 7.

Figure 6C:
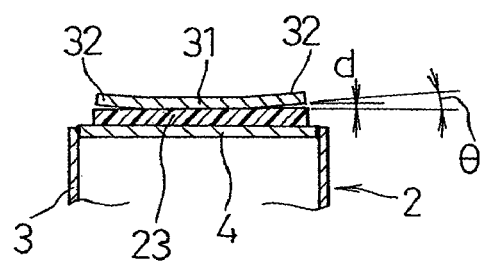

In this embodiment, a collar 9 of the electrode post 8 is formed in a substantially circular shape, with integrated wing pieces 31 extending from both sides of the collar 9 in the lengthwise direction of the lid 4. By inclining both side sections (in the width direction of the lid 4) of each wing piece 31 at an angle θ (approximately 4 to 6°) so that these side sections lift up off the lid 4, connection plate sections 32 that can be elastically displaced in the axial direction of the electrode post 8 are formed at these side sections, as shown in FIG. 6C. Both side edges of these connection plate sections 32 are positioned parallel to the long side surface of the case 2, and the distance with which these side edges are separated from the lid 4, namely the elastic displacement distance d, is set to approximately 0.2 to 0.3 mm. Furthermore, the backup member 23 utilizes a rectangular shaped member that covers the entire area between the wing pieces 31 on both sides of the collar 9.

Figure 7:
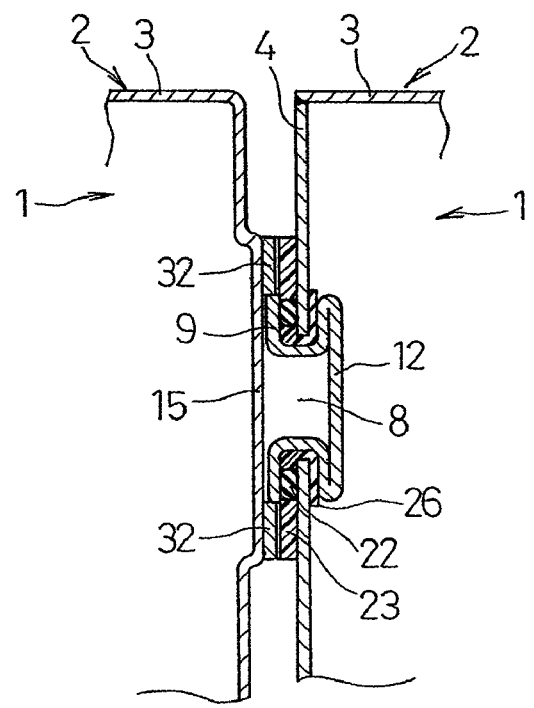
FIG. 7 is a cross-sectional view showing a connection between two sealed batteries of the same embodiment.
Figure 8:
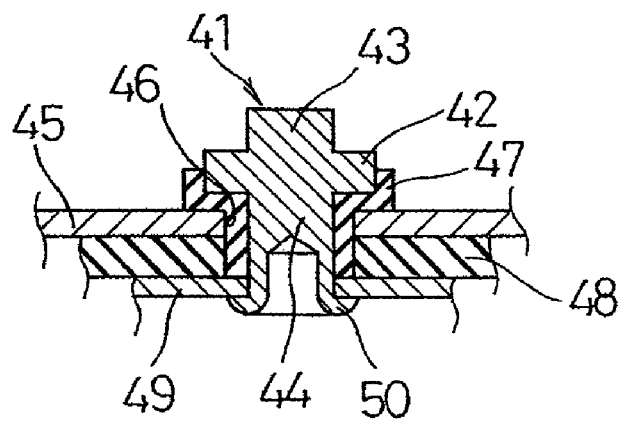
FIG. 8 is a cross-sectional view showing the construction of an electrode post section in a conventional sealed battery.
Figure 9:
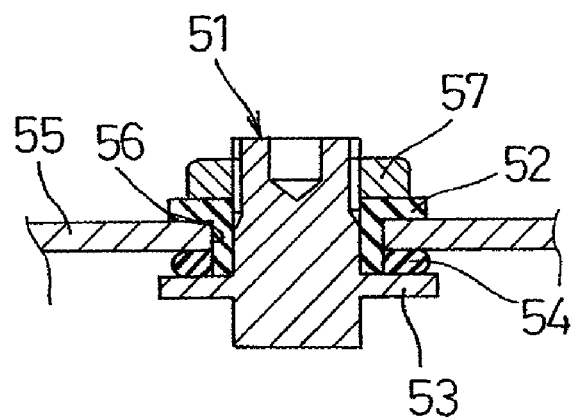
FIG. 9 is a cross-sectional view showing the construction of an electrode post section in another conventional sealed battery.

According to this embodiment, because of the connection plate sections 32 provided on the collar 9 of the electrode post 8, when the electrode posts 8 and the protrusions 15 of a plurality of sealed batteries 1 are connected in series to form a battery module as shown in FIG. 7, the connection plate sections 32 of the electrode post 8 contact the edges of the protrusion 15. Thereby, any variations in the dimensions of each sealed battery 1 can be absorbed by the elastic displacement of the connection plate sections 32. Accordingly, even if a dimensional variation exists in one or more of the sealed batteries 1, when the sealed batteries are combined to form a battery module, each sealed battery 1 occupies the same space. As a result, when a plurality of battery modules are arranged in parallel with insulating sheets disposed therebetween to form a battery pack, the ease of installation of these insulating sheets is significantly improved.

According to a sealed battery of the present invention and a method for manufacturing such a sealed battery, a hollow cylindrical electrode post with one closed end is used, and a compression deformation section produced by deforming the closed end of the electrode post is used for compressing and sealing the sealing section, and for securing the electrode post, and consequently both the weight and the cost of the structure are reduced, while a highly reliable seal are achieved.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A sealed battery comprising:
a metal case which functions as a connection terminal of one polarity, an electrode post through-hole being provided in the case;
an electrode plate assembly housed in the case;
an electrode post which is mounted to the case in an insulated manner and functions as a connection terminal of the other polarity, the electrode post comprising a hollow cylinder with one closed end;
a sealing section with electrical insulation properties, being disposed between the electrode post and the electrode post through-hole; and
a compression deformation section comprising the closed end of the hollow electrode post deformed radially outward, the sealing section compressed and sealed between a collar of the electrode post and the closed end of the hollow electrode post deformed radially outward, and the compression deformation section securing the electrode post;
wherein the electrode post is brought into contact with a collector that is joined to an end face of one polarity of the electrode plate assembly, and an end wall of the compression deformation section of the electrode post is welded to the collector from a position outside the case, through a hollow interior of the electrode post.

2. The sealed battery according to claim 1, wherein the compression deformation section of the electrode post is formed by applying pressure in an axial direction to the closed end of the electrode post in a state where a hollow interior of the electrode post is subjected to fluid pressure.

3. The sealed battery according to claim 1, wherein the end wall of the compression deformation section and the collector are joined by any of laser beam welding and electron beam welding.

4. The sealed battery according to claim 1, wherein a collar that extends radially outwards is provided at the opposite end of the electrode post, and at least one side edge of the collar runs parallel to the edge of the prismatic case.

5. The sealed battery according to claim 4, wherein both side edges of the collar run parallel to the long side surface of the case.

6. A sealed battery comprising:
a metal case which functions as a connection terminal of one polarity, an electrode post through-hole being provided in the case;
an electrode plate assembly housed in the case;
an electrode post which is mounted to the case in an insulated manner and functions as a connection terminal of the other polarity, the electrode post comprising a hollow cylinder with one closed end;
a sealing section with electrical insulation properties, being disposed between the electrode post and the electrode post through-hole; and
a compression deformation section comprising the closed end of the hollow electrode post deformed radially outward, the sealing section compressed and sealed between a collar of the electrode post and the closed end of the hollow electrode post deformed radially outward, and the compression deformation section securing the electrode post;
wherein the sealing section comprises an O-ring which is sandwiched in a compressed state between an outside surface of the case and the electrode post, a backup section that regulates the position of the inner and outer peripheries of the O-ring, and an insulating spacer which is disposed between the through-hole and the electrode post, and between the compression deformation section of the electrode post and the inside surface of the case.

7. A sealed battery comprising:
a metal case which functions as a connection terminal of one polarity, an electrode post through-hole being provided in the case;
an electrode plate assembly housed in the case;
an electrode post which is mounted to the case in an insulated manner and functions as a connection terminal of the other polarity, the electrode post comprising a hollow cylinder with one closed end;
a sealing section with electrical insulation properties, being disposed between the electrode post and the electrode post through-hole;
a compression deformation section comprising the closed end of the hollow electrode post deformed radially outward, the sealing section compressed and sealed between a collar of the electrode post and the closed end of the hollow electrode post deformed radially outward, and the compression deformation section securing the electrode post; and
a collar that extends radially outwards is provided at the opposite end of the electrode post, and at least one side edge of the collar runs parallel to the edge of the prismatic case;
wherein a protrusion that corresponds with the electrode post is formed on the opposite side surface from the side surface of the case of another sealed battery, the surface on which the electrode post is disposed, and at least one side edge of the protrusion and one side edge of the collar are aligned in terms of their relative positions on the protrusion side surface and the electrode post side surface respectively.

8. A sealed battery comprising:
a metal case which functions as a connection terminal of one polarity, an electrode post through-hole being provided in the case;
an electrode plate assembly housed in the case;
an electrode post which is mounted to the case in an insulated manner and functions as a connection terminal of the other polarity, the electrode post comprising a hollow cylinder with one closed end;
a sealing section with electrical insulation properties, being disposed between the electrode post and the electrode post through-hole;
a compression deformation section comprising the closed end of the hollow electrode post deformed radially outward, the sealing section compressed and sealed between a collar of the electrode post and the closed end of the hollow electrode post deformed radially outward, and the compression deformation section securing the electrode post; and
a collar that extends radially outwards is provided at the opposite end of the electrode post, and at least one side edge of the collar runs parallel to the edge of the prismatic case;

wherein a connection plate section that can be elastically displaced in the axial direction of the electrode post is provided on the collar.

9. A method for manufacturing a sealed battery, comprising:
inserting a hollow cylindrical electrode post with one closed end into an electrode post through-hole provided in a lid of a case, with the closed end inserted first and with a sealing section that displays electrical insulation properties and sealing properties disposed between the lid and the electrode post;
compressing the sealing section by subjecting the closed end of the electrode post to an outward expansion in the radial direction and a compression deformation in the axial direction to seal the sealing section, and securing the electrode post to the lid;
housing an electrode plate assembly inside the case;
joining the lid to the case;
joining one end wall of the electrode post to the end face of one polarity of the electrode plate assembly through a hollow interior of the electrode post; and
joining the end face of the other polarity of the electrode plate assembly to the bottom wall of the case.

10. The method for manufacturing a sealed battery according to claim 9, wherein
the compression deformation of the electrode post is conducted by applying pressure in the axial direction to the closed end of the electrode post in a state where the hollow interior is subjected to fluid pressure.

11. A sealed battery comprising:
a metal case which functions as a connection terminal of one polarity, an electrode post through-hole being provided in the case;
an electrode plate assembly housed in the case;
an electrode post which is mounted to the case in an insulated manner and functions as a connection terminal of the other polarity, the electrode post being formed from a hollow cylinder with one closed end;
a sealing section with electrical insulation properties, being disposed between the electrode post and the electrode post through-hole; and
a compression deformation section produced by deforming the closed end of the electrode post radially outward, for compressing and sealing the sealing section, and for securing the electrode post;
wherein the electrode post is brought into contact with a collector that is joined to an end face of one polarity of the electrode plate assembly, and an end wall of the compression deformation section of the electrode post is welded to the collector from a position outside the case, through a hollow interior of the electrode post.

12. A sealed battery comprising:
a metal case which functions as a connection terminal of one polarity, an electrode post through-hole being provided in the case;
an electrode plate assembly housed in the case;
an electrode post which is mounted to the case in an insulated manner and functions as a connection terminal of the other polarity, the electrode post being formed from a hollow cylinder with one closed end;
a sealing section with electrical insulation properties, being disposed between the electrode post and the electrode post through-hole; and
a compression deformation section produced by deforming the closed end of the electrode post radially outward, for compressing and sealing the sealing section, and for securing the electrode post;
wherein the sealing section comprises an O-ring which is sandwiched in a compressed state between an outside surface of the case and the electrode post, a backup section that regulates the position of the inner and outer peripheries of the O-ring, and an insulating spacer which is disposed between the through-hole and the electrode post, and between the compression deformation section of the electrode post and the inside surface of the case.

13. A sealed battery comprising:
a metal case which functions as a connection terminal of one polarity, an electrode post through-hole being provided in the case;
an electrode plate assembly housed in the case;
an electrode post which is mounted to the case in an insulated manner and functions as a connection terminal of the other polarity, the electrode post being formed from a hollow cylinder with one closed end;
a sealing section with electrical insulation properties, being disposed between the electrode post and the electrode post through-hole; and
a compression deformation section produced by deforming the closed end of the electrode post radially outward, for compressing and sealing the sealing section, and for securing the electrode post;
wherein a collar that extends radially outwards is provided at the opposite end of the electrode post, and at least one side edge of the collar runs parallel to the edge of the prismatic case; and
wherein a protrusion that corresponds with the electrode post is formed on the opposite side surface from the side surface of the case of another sealed battery, the surface on which the electrode post is disposed, and at least one side edge of the protrusion and one side edge of the collar are aligned in terms of their relative positions on the protrusion side surface and the electrode post side surface respectively.

14. A sealed battery comprising:
a metal case which functions as a connection terminal of one polarity, an electrode post through-hole being provided in the case;
an electrode plate assembly housed in the case;
an electrode post which is mounted to the case in an insulated manner and functions as a connection terminal of the other polarity, the electrode post being formed from a hollow cylinder with one closed end;
a sealing section with electrical insulation properties, being disposed between the electrode post and the electrode post through-hole; and
a compression deformation section produced by deforming the closed end of the electrode post radially outward, for compressing and sealing the sealing section, and for securing the electrode post;
wherein a collar that extends radially outwards is provided at the opposite end of the electrode post, and at least one side edge of the collar runs parallel to the edge of the prismatic case; and
wherein a connection plate section that can be elastically displaced in the axial direction of the electrode post is provided on the collar.

* * * * *